(12) United States Patent
Edmiston (10) Patent No.: US 12,460,617 B1
(45) Date of Patent: Nov. 4, 2025

(54) TRANSVERSE-AXIS TORQUE TURBINE

(71) Applicant: Daniel Edward Edmiston, Brookfield, MO (US)

(72) Inventor: Daniel Edward Edmiston, Brookfield, MO (US)

( * ) Notice: Subject to any disclaimer, the term of this patent is extended or adjusted under 35 U.S.C. 154(b) by 0 days.

(21) Appl. No.: 19/074,364

(22) Filed: Mar. 8, 2025

(51) Int. Cl.
*F03D 3/06* (2006.01)
*F03D 3/00* (2006.01)

(52) U.S. Cl.
CPC ............. *F03D 3/061* (2013.01); *F03D 3/009* (2023.08); *F05B 2240/213* (2013.01); *F05B 2240/301* (2013.01)

(58) Field of Classification Search
CPC . F03D 3/009; F03D 3/06; F03D 3/061; F05B 2240/213
See application file for complete search history.

(56) References Cited

U.S. PATENT DOCUMENTS

| | | | | |
|---|---|---|---|---|
| 9,494,136 B1 * | 11/2016 | Edmiston | ................ | F03D 3/005 |
| 10,458,394 B2 * | 10/2019 | De Luca | ................... | F03G 6/02 |
| 2009/0160196 A1 * | 6/2009 | Metzloff | ............... | F03D 3/0463 |
| | | | | 290/55 |

FOREIGN PATENT DOCUMENTS

WO   WO-2006063833 A1 *  6/2006  ............ F03B 17/065

* cited by examiner

*Primary Examiner* — Christopher R Legendre (57) ABSTRACT

A Savonius-type rotor assembly is improved by utilizing a plurality of blades, shaped and interconnected by a plurality of shaped surfaces, forming a rotor shell exposed to a flowing fluid that efficiently redirects the surface flow along each shaped surface directly against the flowing fluid at its blade tip as each blade tip is pointed directly into the flowing fluid. Each shaped skin surface has a concave section and a convex section. The concave section of each shaped surface forms the concave portion of one blade, and the convex section of the same shaped surface forms the convex portion of an adjacent blade. On a cross-sectional plane perpendicular to the rotor axis, each shaped surface follows an s-shape, and the concave section substantially follows an Euler spiral segment that is tangent at its outer end to the circumference of the rotor.

14 Claims, 13 Drawing Sheets

TRANSVERSE-AXIS TORQUE TURBINE

BACKGROUND OF THE INVENTION

This invention relates to transverse-axis turbines that rotate in fluid flows that are perpendicular to their axis of rotation. Well-known turbines of this type include Savonius and Darrieus vertical-axis wind turbines and vertical and horizontal-axis cross-flow turbines designed for use in rivers and tidal flows. Many of these turbines operate in harsh, uncontrolled environments where gusts, turbulent flows, and debris impact their survivability.

PRIOR ART

The turbines of U.S. Pat. No. 9,494,136, issued on Nov. 15, 2016, to the inventor of the present application, have demonstrated their ability to survive and produce power in turbulent and stormy conditions. The novel geometry of the present invention enhances the power coefficient and performance in turbulent environments of the rotor of these structurally robust turbines and other similar turbines.

SUMMARY

Embodiments of the present invention are transverse-axis turbines with rotors having a plurality of interconnected shaped surfaces symmetrically disposed about the rotor axis and exposed to a fluid flow. The plurality of interconnected shaped surfaces forms a shell, providing space for a shielded core within the rotor. The shielded core provides protection from the turbulence and debris of the fluid flow to rotating and stationary elements of the turbine placed within.

Each shaped surface has a concave section and a convex section. In cross sectional views, perpendicular to the axis of these turbine rotors, the shaped surfaces substantially follow an s-shaped curve wherein each end of the s-shaped curve is tangent to the circle it inscribes when rotated about the axis. The outer end of each s-shaped curve's concave section, joined to the outer end of the adjacent s-shaped curve's convex section, forms a perimeter around the axis.

The geometry of the shaped surface redirects the fluid flow along its surface directly into the oncoming flow at the surface's outer end when the outer end of one shaped surface points into the fluid flow providing torque to the turbine rotor.

The shape of the concave section of the shaped surfaces of the rotor, defined in the Detailed Description of the Drawings, is crucial to the performance of the turbines.

Each additional shaped surface used in the rotor increases the size of the shielded core in relation to the diameter of the rotor. The turbine's environment, intended use, and survivability requirements determine the preferred embodiment.

BRIEF DESCRIPTION OF DRAWINGS

In the drawings, related figures share the same numeral but have different alphabetical suffixes.

DRAWINGS REFERENCE NUMERALS

In the drawings, identical individual elements are identified with the same element reference numeral, with the addition of an apostrophe for each subsequent element. A description of one individual element will suffice as a description of each of the other identical elements.

Example: first s-shaped curve 20, second s-shaped curve 20', third s-shaped curve 20".

Figure 2A:
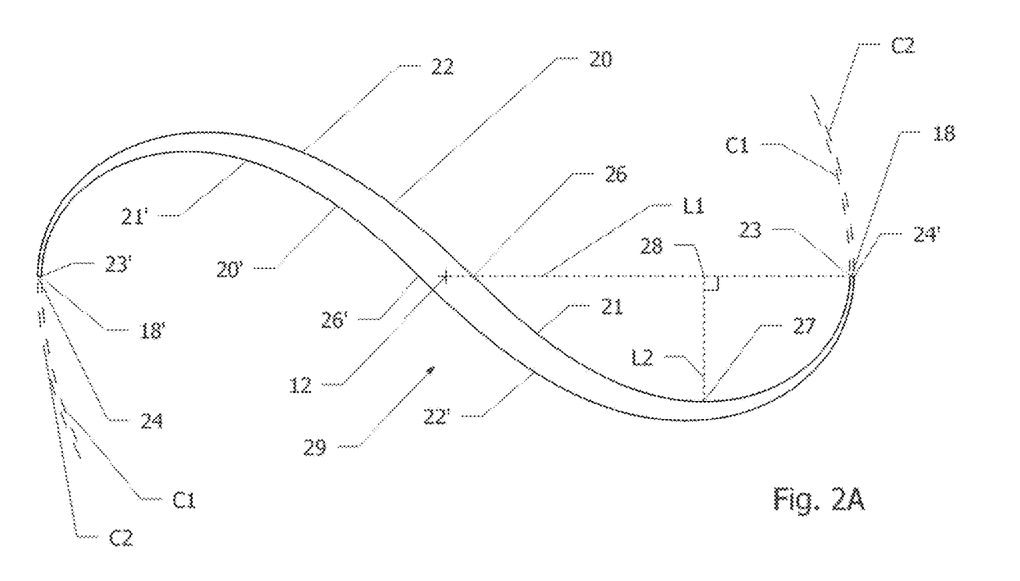
FIGS. 2A and 2B are cross sectional views of rotor 11 of FIG. 1A, along line 2-2.
Figure 2B:
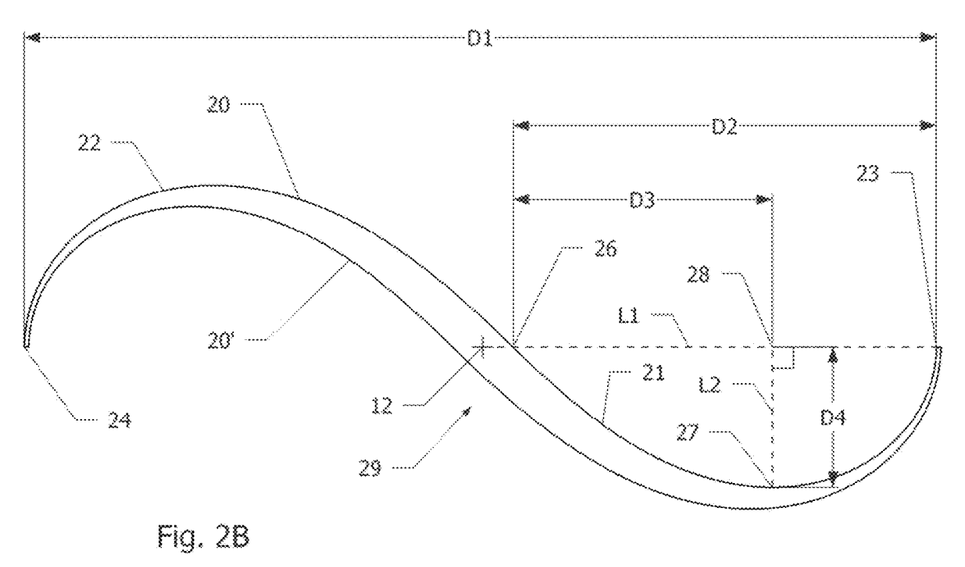

11 rotor (of an embodiment of the invention)
12 axis (rotational axis of the turbine)
13 shaped surface
14 shielded core
15 support and bearing structure
16 top end plate
17 bottom end plate
18 connection joint
2-2 view line for FIGS. 2A and 2B
20 s-shaped curve (cross-section of a shaped surface 13)
21 concave section
22 convex section
23 concave outer end
24 convex outer end
26 dividing point (intersection of s-shaped curve 20 and reference line L1)
27 distant point (on concave section 21 perpendicular to reference line L1)
28 reference point (intersection of reference line L1 and perpendicular line L2)
29 rotor cross-section (of a rotor 11 with two shaped surfaces 13)
39 rotor cross-section (of a rotor 11 with three shaped surfaces 13)
49 rotor cross-section (of a rotor 11 with four shaped surfaces 13)
59 rotor cross-section (of a rotor 11 with five shaped surfaces 13)
69 rotor cross-section (of a rotor 11 with six shaped surfaces 13)
70 fluid flow
71 turbine rotation
72 Euler spiral segment
81 two-dimensional plane
91(21) twisted concave section
92(22) twisted convex section 93(23) twisted concave end
94(24) twisted convex end
101 curved blade
102 blade tip
103 concave section
104 convex section
105 s-shaped curved surface
209 rotor cross-section (of a rotor 11 with two pairs of shaped surfaces 13)
220 small s-shaped curve (cross-section of a shaped surface 13)
221 concave section (of small s-shaped curve 220)
222 convex section (of small s-shaped curve 220)
C1 first circle (inscribed by concave outer end 23)
C2 second circle (inscribed by convex outer end 24)
D1 dimension between points 23 and 24
D2 dimension between points 23 and 26
D3 dimension between points 26 and 28
D4 dimension between points 27 and 28
L1 reference line (between axis 12 and convex outer end 23)
L2 perpendicular line (between points 27 and 28)
R radius

DETAILED DESCRIPTION OF THE DRAWINGS

Figure 1:
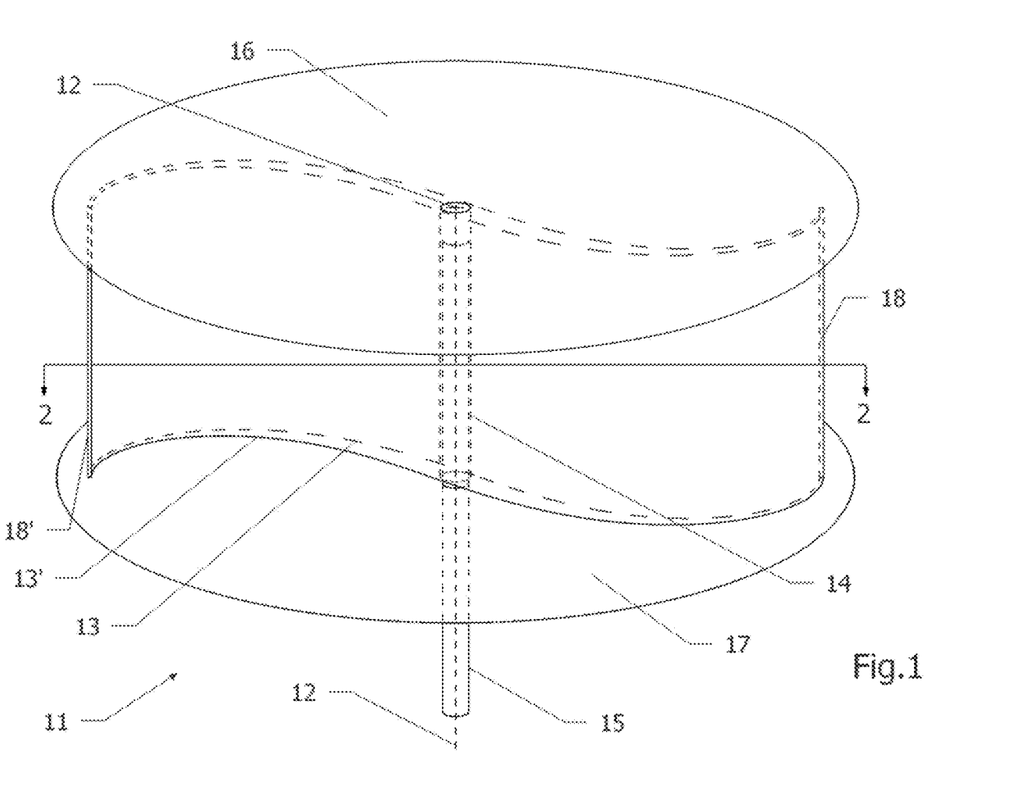
FIG. 1 is a perspective front view of a transverse-axis turbine rotor assembly with two shaped-surfaces 13.

FIG. 1 illustrates a perspective view of a transverse-axis turbine rotor 11 having a first shaped surface 13 and a second shaped surface 13'. Both shaped surfaces 13 and 13', identical in size and shape, are symmetrically disposed about the rotor's 11 rotational axis 12. A support and bearing structure 15 supports the rotor 11 and allows rotation about axis 12.

The shaped surfaces 13 and 13' secured to each other along narrow connection joints 18 and 18' form a shell surrounding axis 12. A hollow shielded core is 14 located within the formed shell. Shielded core 14 houses a portion of the support and bearing structure 15.

The shaped surfaces 13 and 13' are attached to a top end plate 16 and a bottom end plate 17.

View line 2-2 indicates the cross-sectional view of FIG. 2A and FIG. 2B.

FIG. 2A illustrates a rotor cross-section 29 viewed along line 2-2 of rotor 11 of FIG. 1A, perpendicular to axis 12. Cross-section 29 has two s-shaped curves, 20 and 20', that are cross-sections of the shaped surfaces 13 and 13' (not shown) of rotor 11 of FIG. 1. Each s-shaped curve 20 has a concave section 21 with a concave outer end 23 and a convex section 22 with a convex outer end 24.

A first connection joint 18 joins the concave outer end 23 of concave section 21 of s-shaped curve 20 to the convex outer end 24' of convex section 22' of s-shaped curve 20', and a second connection joint 18' joins the concave outer end 23' of concave section 21' of s-shaped curve 20' to the convex outer end 24 of convex section 22 of s-shaped curve 20, forming a contiguous perimeter around the axis 12.

Each concave outer end 23 inscribes a first circle C1 as it rotates about axis 12 and is tangent to the first circle C1. Each convex outer end 24 inscribes a second circle C2 as it rotates about axis 12 and is tangent to the second circle C2.

A reference line L1 between the axis 12 and concave outer end 23 intersects the s-shaped curve 20 at a dividing point 26. Dividing point 26 divides the concave section 21 from the convex section 23 on each s-shaped curve 20.

A perpendicular line L2, perpendicular to reference line L1, intersects a distant point 27 on concave section 21, where distant point 27 is the most distant point on concave section 21 from reference line L1. The perpendicular line L2 intersects reference line L1 at a reference point 28.

FIG. 2B, FIG. 3, FIG. 4, FIG. 5, and FIG. 6 are cross-sectional views of turbine rotors 11 with two to six shaped surfaces 13 (not shown) perpendicular to axis 12.

FIG. 2B illustrates the rotor cross-section 29 of rotor 11 with two interconnected shaped surfaces 13 symmetrically disposed about axis 12. Each shaped surface 13 follows an s-shaped curve 20, and 20' on the rotor cross-section 29.

Figure 3:
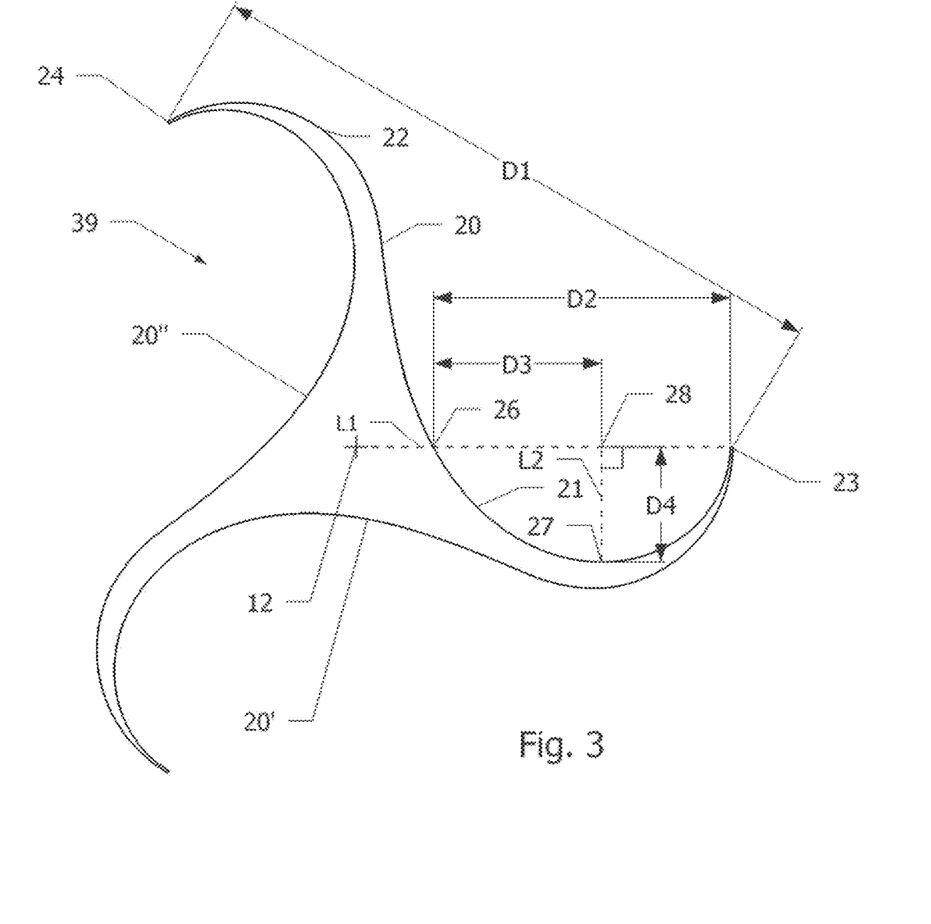
FIG. 3 is a cross-sectional view of a turbine rotor 11 with three shaped surfaces 13.

FIG. 3 illustrates the rotor cross-section 39 of a rotor 11 with three interconnected shaped surfaces 13 symmetrically disposed about axis 12. Each shaped surface 13 follows an s-shaped curve 20, 20', and 20" on the rotor cross-section 39.

Figure 4:
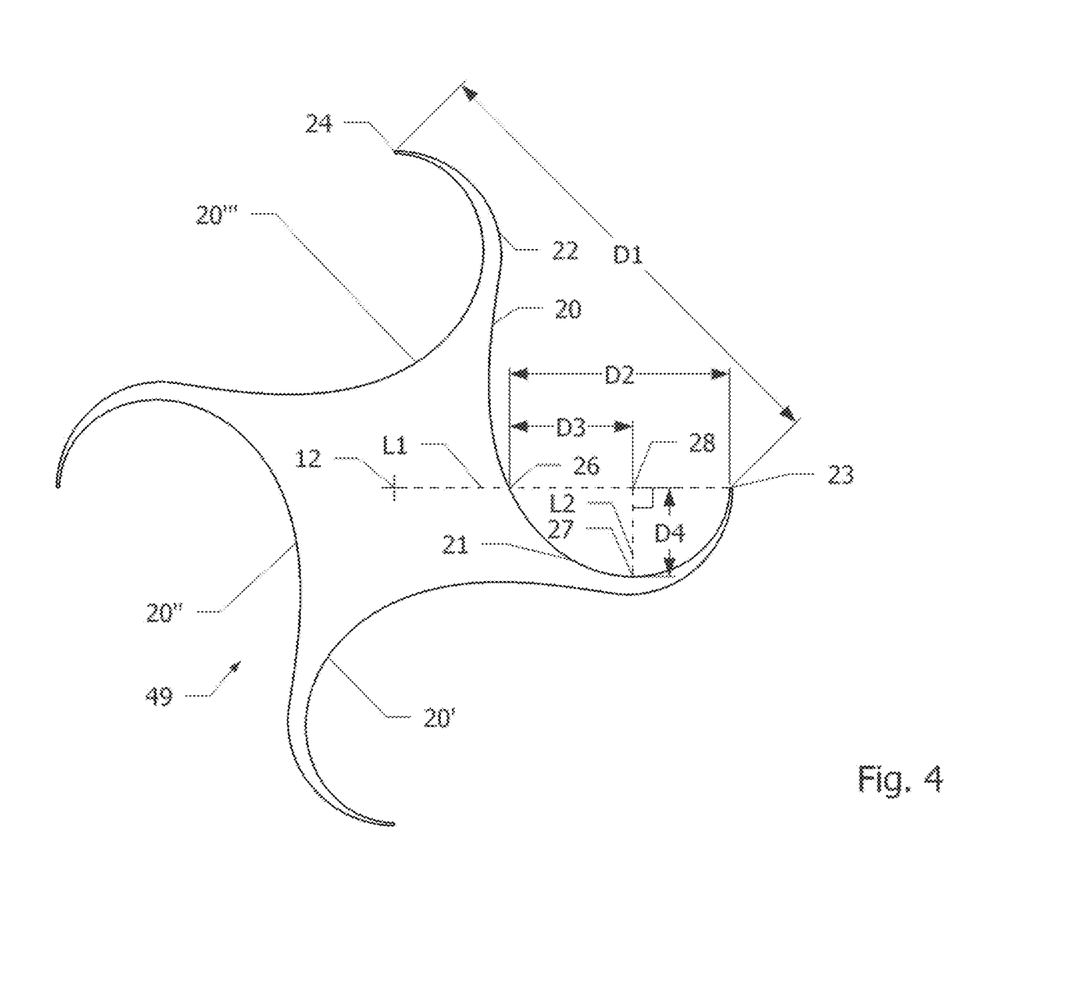
FIG. 4 is a cross-sectional view of a turbine rotor 11 with four shaped surfaces 13.

FIG. 4 illustrates the rotor cross-section 49 of a rotor 11 with four interconnected shaped surfaces 13 symmetrically disposed about axis 12. Each shaped surface 13 follows an s-shaped curve 20, 20', 20" and 20" on the rotor cross-section 49.

Figure 5:
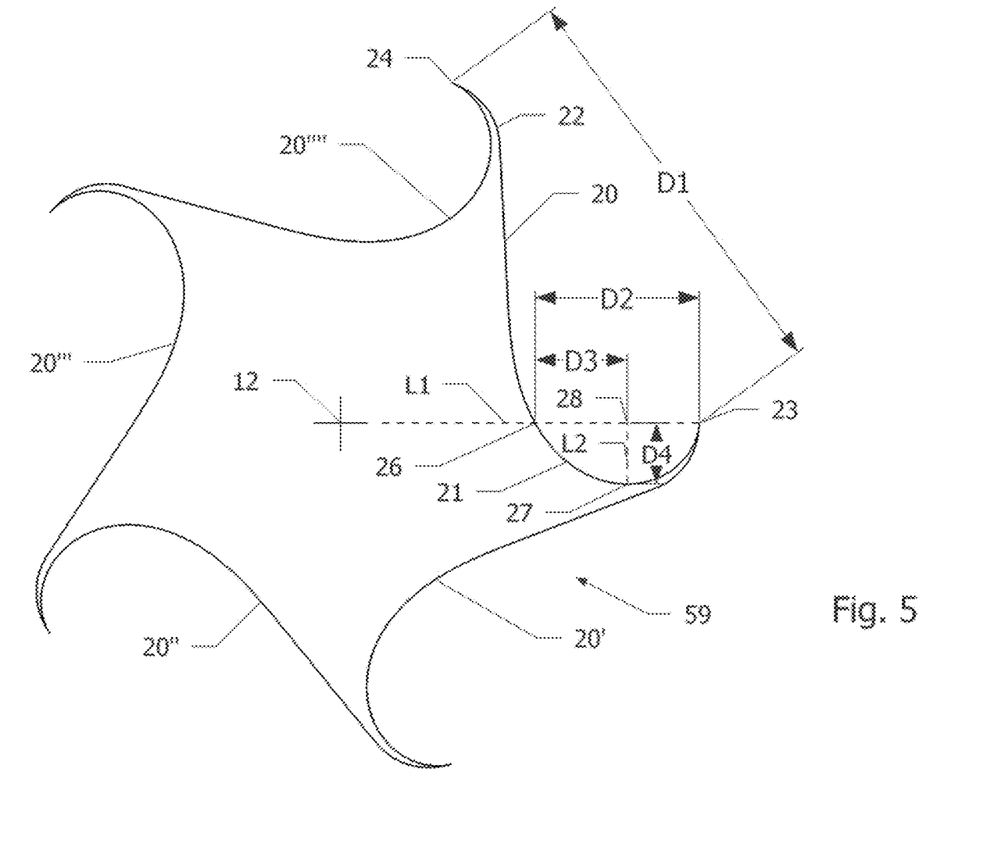
FIG. 5 is a cross-sectional view of a turbine rotor 11 with five shaped surfaces 13.

FIG. 5 illustrates the rotor cross-section 59 of a rotor 11 with two interconnected shaped-surfaces 13 symmetrically disposed about axis 12. Each shaped surface 13 follows an s-shaped curve 20, 20', 20", 20''' and 20"" on the rotor cross-section 59.

Figure 6:
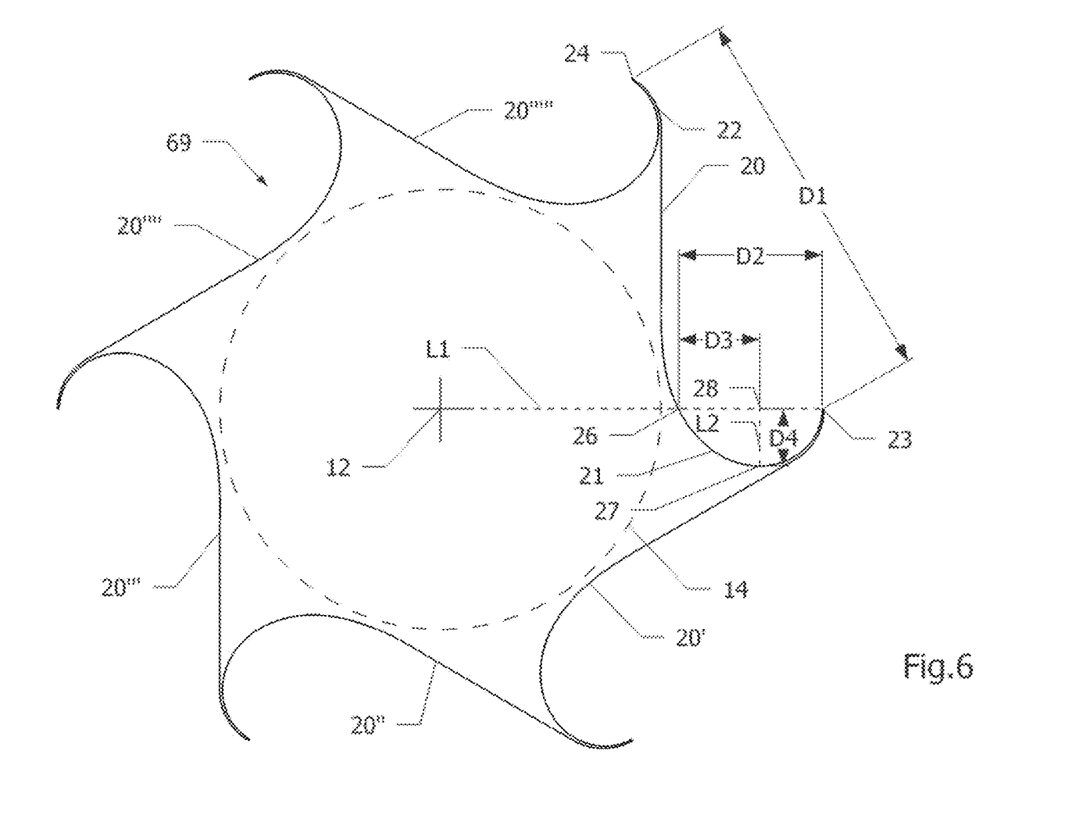
FIG. 6 is a cross-sectional view of a turbine rotor 11 with six shaped surfaces 13.

FIG. 6 illustrates the rotor cross-section 69 of a rotor 11 with six interconnected shaped surfaces 13 symmetrically disposed about axis 12. Each shaped surface 13 follows an s-shaped curve 20, 20', 20", 20''', 20"", and 20''''' on the rotor cross-section 69. The shielded core 14 circumference is also indicated.

The s-shaped curves 20 of rotor cross-sections 29, 39, 49, 59, and 69 all share the following characteristics:

Each s-shaped curve 20 has a concave section 21 with a concave outer end 23 and a convex section 22 with a convex outer end 24.

A reference line L1, between axis 12 and concave outer end 23, intersects each s-shaped curve at a dividing point 26. Dividing point 26 divides concave section 21 from convex section 23. Concave section 21 and convex section 23 are tangent at dividing point 26.

The shape of the concave section 21 of the s-shaped curve 20 is crucial to the efficient transitioning of fluid flow in the desired direction. The concave section 21 is concave, with no portion being linear or convex. The concave section 21 approximates the shape of an Euler spiral segment 72 (sometimes referred to as Cornu spiral, clothoid, or railway transition curve).

The convex section 22 of the s-shaped curve 20 is concave at dividing point 26 then smoothly transitions to convex before reaching its convex outer end 24.

A perpendicular line L2, perpendicular to reference line L1, intersects a distant point 27 on concave section 21, where distant point 27 is the most distant point on concave section 21 from reference line L1. Perpendicular line L2 intersects reference line L1 at a reference point 28.

The distance between concave outer end 23 and convex outer end 24 is dimension D1.
The distance between concave outer end 23 and dividing point 26 is dimension D2.
The distance between dividing point 26 and reference point 28 is dimension D3.
The distance between distant point 27 and reference point 28 is dimension D4.
Dimension D3 divided by dimension D2 is greater than 0.48 and less than 0.64
Dimension D4 divided by dimension D2 is greater than 0.30 and less than 0.44

Dimension D4 divided by dimension D1 is greater than 0.11 and less than 0.22

The ideal ratios of D3/D2, D4/D2, and D4/D1 are dependent on the number of shaped surfaces 13 used in the rotor. 11, and other factors.

Figure 7:
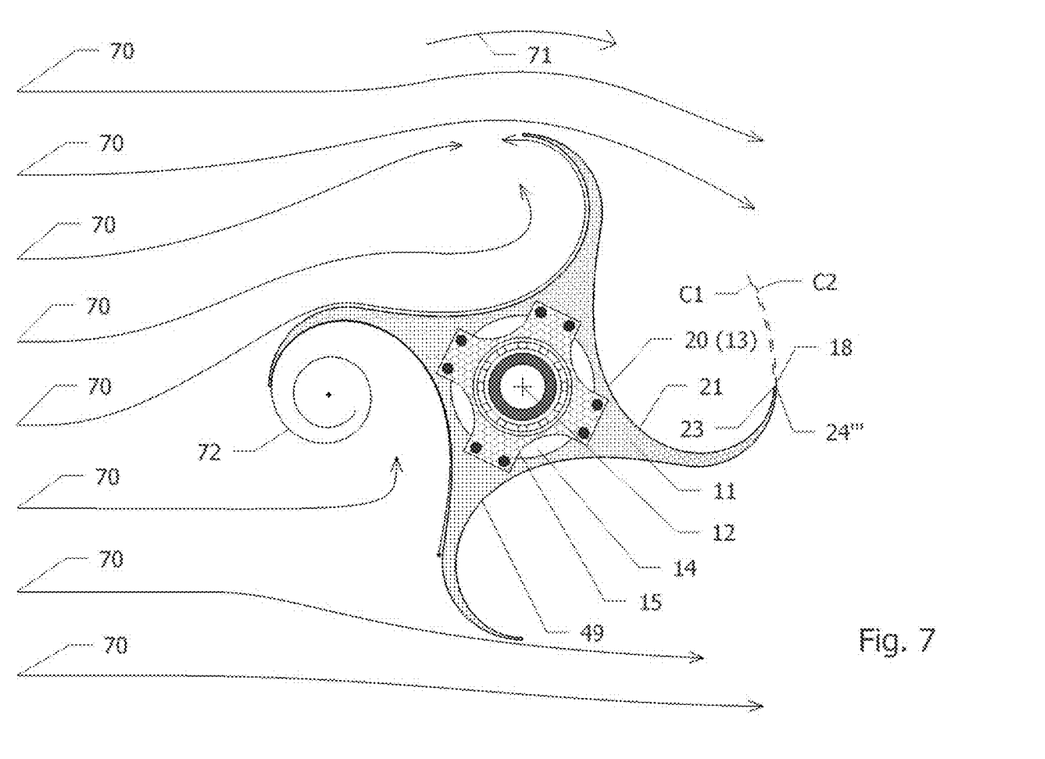
FIG. 7 is a cross-sectional view of a rotor 11 showing an operating state thereof.

FIG. 7 illustrates a rotor cross-section 49 of a rotor 11 with four interconnected shaped surfaces 13 (not shown) symmetrically disposed about axis 12 with details added, including the direction of fluid flow 70 and turbine rotation 71, to visualize the operation of embodiments while rotating under load.

FIG. 7 illustrates a rotor cross-section 49 of a rotor 11 with four interconnected shaped surfaces 13 (not shown) symmetrically disposed about axis 12 with details added.

The convex outer end 24, of each s-shaped curve 20, inscribes a second circle C2 as it rotates about axis 12 and is tangent to the second circle C2.

All s-shaped curves 20 are interconnected by connecting joints 18 joining the concave outer end 23 of one s-shaped curve 20 to the convex outer end 24 of its adjacent s-shaped curve 20. A hollow shielded core 14 within the perimeter of the rotor cross-section 49 provides space for a support and bearing structure 15 to be housed and protected from the fluid flow 70.

The concave section 21 of each s-shaped curve 20 substantially follows the shape of an Euler spiral segment 72.

Figure 8A:
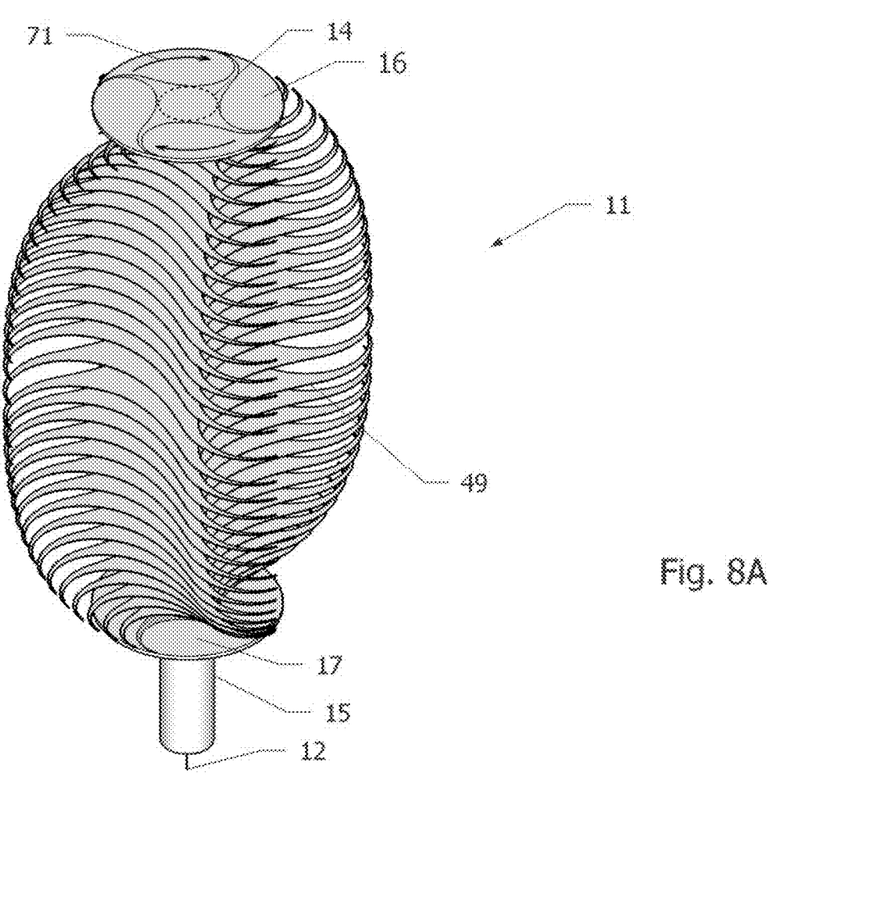
FIG. 8A is a bottom perspective view of multiple cross-sections of a turbine rotor 11 with four shaped surfaces 13. (Shaped surfaces 13 not shown).

FIG. 8A is a top perspective view illustrating multiple rotor cross-sections 49 of a turbine with four shaped surfaces 13 (shaped surfaces 13 not shown). A support and bearing structure 15 extends inside the shielded core 14 of the rotor 11.

All cross-sections 49 are of the four shaped surfaces 13 symmetrically disposed about axis 12. The rotor cross-sections 49 are smallest at the top end plate 16 and the bottom end plate 17 and are rotationally aligned.

The rotor cross-sections 49 progressively get larger and progressively rotate in the direction of the turbine's operational direction of rotation 71 as they approach the midpoint between the top and bottom end plates 16, and 17.

Figure 8B:
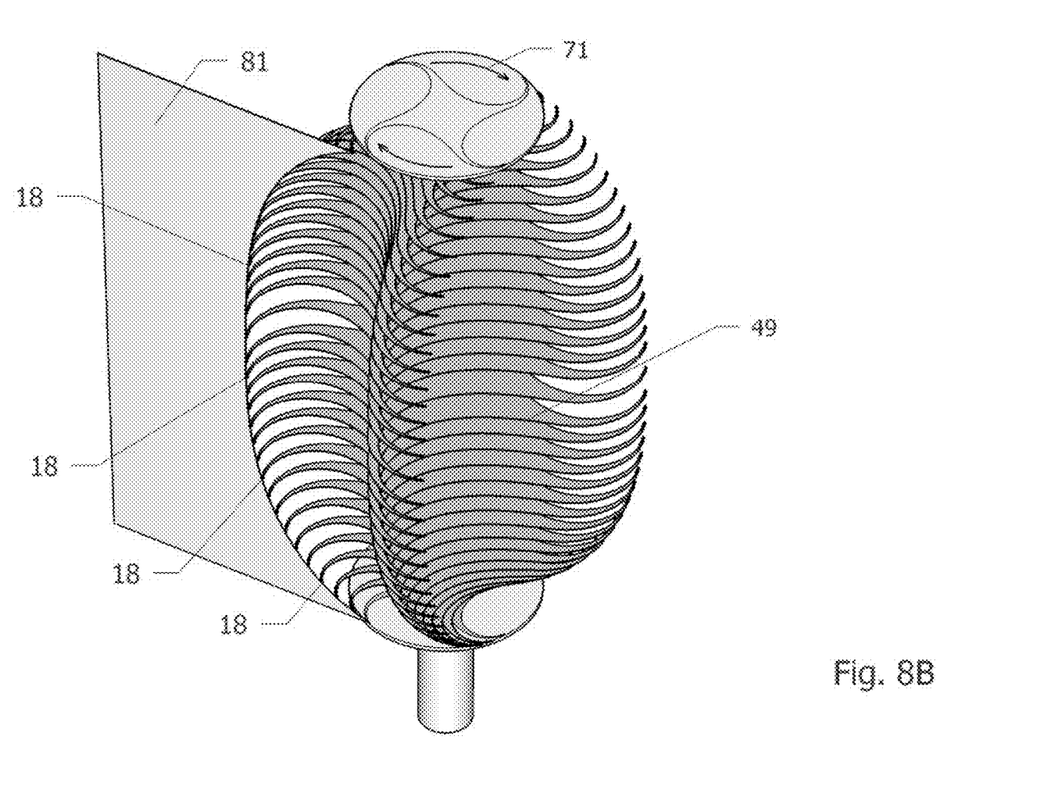
FIG. 8B is a top perspective view of multiple cross-sections of rotor 11 of FIG. 8A.

FIG. 8B is a top perspective view illustrating other characteristics of multiple rotor cross section 49 of the turbine of FIG. 8A. The turbine's operational direction of rotation 71 is indicated, and one connecting joint 18 is shown to be in common with a two-dimensional plane 81. Each rotor cross-section 49 is rotated a predetermined amount such that each connecting joint 18 falls on a corresponding two-dimensional plane 81.

Figure 9A:
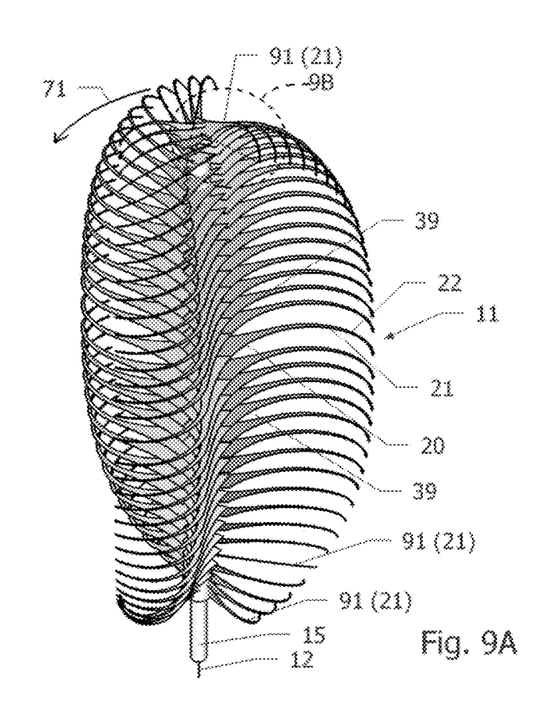
FIG. 9A is a top perspective view of multiple cross-sections of a turbine rotor 11 with three shaped surfaces 13. (Shaped surfaces 13 not shown).

FIG. 9A is a top perspective view of multiple cross-sections of a turbine with a rotor 11 having three interconnected shaped surfaces 13. (Shaped surfaces 13 not shown). Support and bearing structure 15, axis 12, and the turbine's operational direction of rotation 71 are also illustrated.

For a substantial portion of the rotor 11, the rotor cross-sections 39 are perpendicular to axis 12. The cross-sections of the shaped surfaces 13 approaching the ends of the rotor are, rotated concave sections 91 (21) joined to rotated convex sections 92' (22'), not perpendicular to the axis. The amount of rotation increases incrementally until reaching the end of the rotor 11.

Figure 9B:
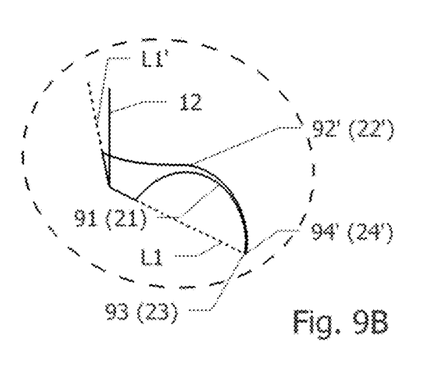
FIG. 9B is an enlarged view of a portion of FIG. 9A.

FIG. 9B is an enlarged view of a rotated cross-section of the shaped surface 13 in FIG. 9. An s-shaped curve 20 is cut along the reference lines L1 and L1', and the concave section 21 together with its joined convex section 22' are rotated 75 degrees with reference line L1 as the rotational axis. The rotated concave section 91 (21) and the joined rotated convex section 92' (22') are cross sections of their respective shaped surface 13 (not shown). The rotated concave end 93 (23) and the rotated convex end 94' (24') point inward towards the middle of the rotor 11, in lieu of end plates 16 and 17 (not shown).

Figure 10A:
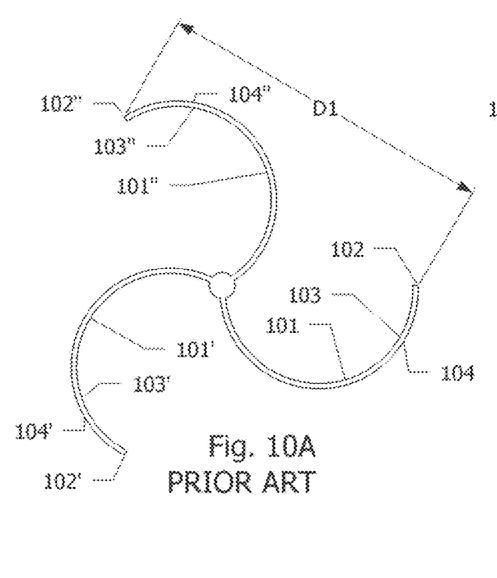
FIG. 10A is a cross-sectional view of a prior art Savonius rotor.

FIG. 10A Prior Art is a cross-sectional view of a Savonius turbine rotor having three 'curved blades 101, 101', and 101". Each curved blade 101 has a corresponding blade tip 102, a corresponding concave section 103, and a corresponding convex section 104. The distance between adjacent pairs of blade tips 102 is D1.

Figure 10B:
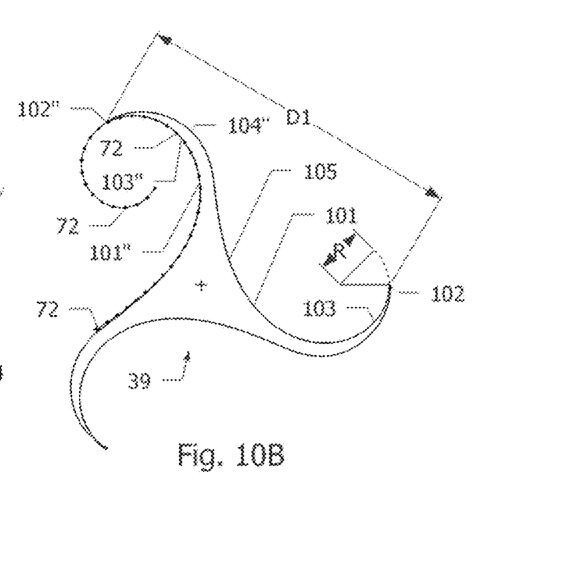
FIG. 10B is a cross-sectional view of a turbine rotor 11 in accordance with the present invention.

FIG. 10B is the rotor cross-section 39 of FIG. 3 described as an improved version of the Savonius turbine rotor of FIG. 10A.

Three s-shaped curved surfaces 105 are interconnected at the three blade tips 102.

The s-shaped curved surface 105 spans the gap between blade tip 102 and blade tip 102".

The s-shaped curved surface 105 has a concave section 103 forming the concave section 103 of curved blade 101, and a convex section 104" forming the convex section 104" of curved blade 101".

The concave section 103" follows the path of an Euler spiral segment 72 and has a radius R at its concave end 102. Radius R is 0.138 times the distance, between blade tips 102 and 102", D1.

Figure 11:
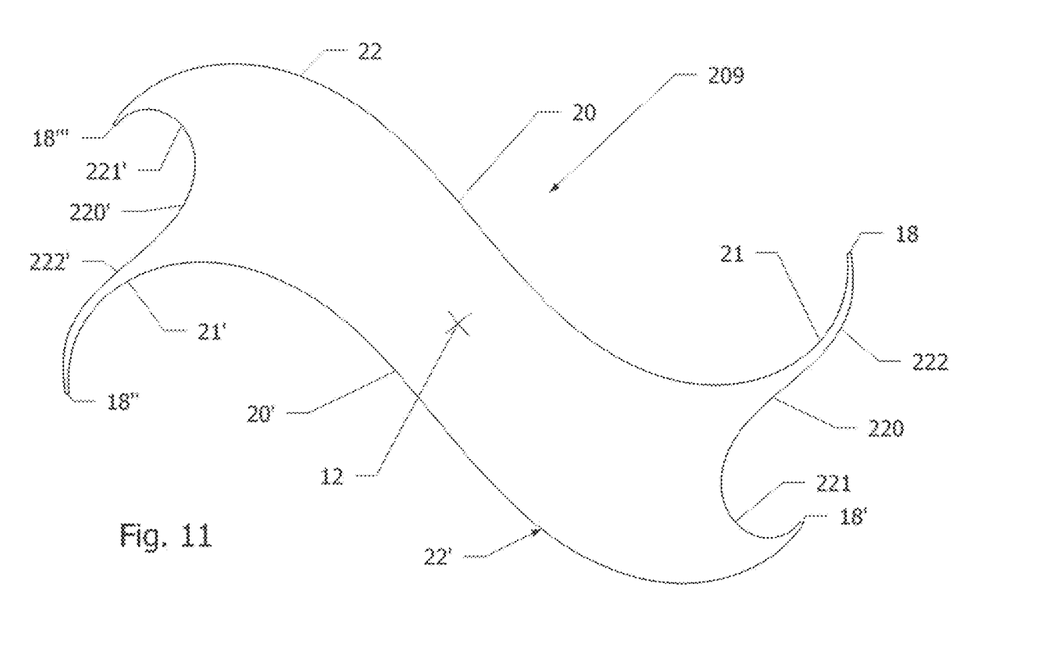
FIG. 11 is a cross-sectional view of a turbine rotor 11 with two pairs of shaped surfaces 13.

FIG. 11 illustrates a rotor cross-section 209 of a rotor 11 with four shaped-surfaces 13. The cross-section 209 has a pair of large s-shaped curves 20 and 20' and a pair of small s-shaped curves 220 and 220'. Each large s-shaped curve 20 has a concave section 21 and a convex section 22, and each small s-shaped curve 220 has a concave section 221 and a convex section 222. Concave sections 21 and 221 each follow the shape of an Euler spiral segment 72.

In the rotor cross-section 209, each concave section 21 joins a convex section 222, and each convex section 22 joins a concave section 221 at a connection joint 18 forming a contiguous perimeter perpendicular and symmetrically disposed about an axis 12.

Operation and Preferred Embodiment

FIG. 7 (including FIG. 1, FIG. 3, FIG. 4, FIG. 5, FIG. 6, FIG. 8A, FIG. 8B, FIG. 9A, FIG. 10B, and FIG. 11)

The function of each shaped surface 13 is to redirect as much as possible of the fluid flow 70, along its surface, directly against the fluid flow 70 at its connection joint 18 each time the connection joint 18 points directly into the fluid flow 70.

The s-shaped curves 20 of rotor cross-sections 29, 39, 49, 59, and 69 provide a geometry that facilitates a smooth directional transition of fluid flow 70 along the surface of the shaped surfaces 13 with the s-shaped curves' 20 concave sections 21 substantially following the shape of an Euler spiral segment 72.

Each shaped surface 13 provides one pulse of torque for each revolution of the rotor 11.

Turbine rotors 11 with two shaped-surfaces 13 can provide the highest power coefficient. Each additional shaped surface 13 used in the rotor 11 increases the size of the shielded core 11 in relation to the diameter of the rotor in addition to providing smoother power delivery and more robust rotor 11 structures.

Consideration of the turbine's environment intended use and survivability requirements will determine the preferred embodiment for each given application.

This invention allows for distinct options when choosing the embodiment that best suits the turbine's environment, intended use, and survivability requirements.

The turbines are scalable for use in either air or water.

The appended claims should be used to determine the scope of the embodiments and not limited to examples given.

The invention claimed is:

1. A method of manufacturing a Savonius-type turbine rotor having a plurality of curved blades, each said curved blade having a blade tip disposed along a circumference of said rotor, comprising:
   providing a plurality of s-shaped curved surfaces wherein each said s-shaped curved surface having a concave section and a convex section spans between one said blade tip of one said curved blade and an adjacent said blade tip of an adjacent said curved blade, with said concave section of each said s-shaped curved surface forming said concave portion of one said curved blade and said convex section of the same said s-shaped curved surface forming said convex portion of said adjacent curved blade, and each said concave section following the curvature of an Euler spiral segment wherein said Euler spiral segment at said blade tip, tangent to said circumference, has a radius being 0.04 to 0.20 times the distance between said adjacent curved blade tips,
   interconnecting said plurality of s-shaped curved surfaces at said blade tips forming said rotor.

2. A transverse-axis turbine rotor assembly driven about an axis by a fluid flow, said assembly comprises:
   a support and bearing structure,
   a rotor, mounted on said support and bearing structure facilitating rotation about the axis, said rotor including:
      a plurality of shaped surfaces symmetrically disposed about the axis and a plurality of interconnecting joints interconnecting said plurality of shaped surfaces forming a rotor shell exposed to said fluid flow, having a surface flow along said shaped surfaces,
      a plurality of rotor cross-sections of said shaped surfaces along the axis, each on a plane perpendicular to the axis, wherein:
         each said plurality of shaped surfaces following an s-shaped curve on said plurality of rotor cross-sections with said s-shaped curve consisting of a concave section and a convex section and said concave section having a concave outer end, when rotated about the axis, inscribes a first circle with said concave outer end being tangent to said first circle, and
         each said convex section having a convex outer end, when rotated about the axis, inscribes a second circle with said convex outer end being tangent to said second circle, and each said interconnection joint joins a said s-shaped curve to an adjacent s-shaped curve wherein each said s-shaped curve's said concave outer end is joined to the said convex outer end of said adjacent s-shaped curve, such that said plurality of s-shaped curves forms a perimeter about the axis on said rotor cross-section, and
      said s-shaped curves each having a reference line, starting at the axis and ending at said concave outer end, intersecting said s-shaped curve at a dividing point dividing said concave section from said convex section, and
      said s-shaped curves are further defined by use of a perpendicular line on said rotor cross-section, with the said perpendicular line being perpendicular to the said reference line and passing through a distant point on said concave section, where said distant point is the point on said concave section that is most distant from said reference line, and defining a reference point as being the point where said perpendicular line intersects said reference line, wherein:
         said s-shaped curve having a geometry that is constrained by:
            a quotient D3/D2, where D3 is the distance between said reference point and said dividing point and D2 is the distance between said concave outer end and said dividing point, being greater than 0.48 and less than 0.64, and
            a quotient D4/D2, where D4 is the distance between said most distal point and said reference point, being greater than 0.30 and less than 0.44, and a quotient D4/D1, where D1 is the distance between said concave outer end and said convex outer end, being greater than 0.11 and less than 0.22, thereby:
         as each said joined outer end points directly into said fluid flow, a said shaped surface redirects its said surface flow directly against said fluid flow at said joined outer end.

3. The rotor assembly of claim 2 wherein said rotor has two of the shaped surfaces.

4. The rotor assembly of claim 2 wherein said rotor has three of the shaped surfaces.

5. The rotor assembly of claim 2 wherein said rotor has four of the shaped surfaces.

6. The rotor assembly of claim 2 wherein said rotor has a first pair of the shaped surfaces and a second pair of the shaped surfaces, wherein said first pair of the shaped surfaces is larger than said second pair of the shaped surfaces.

7. The rotor assembly of claim 2 wherein said rotor has five of the shaped surfaces.

8. The rotor assembly of claim 2 wherein said rotor has six of the shaped surfaces.

9. The rotor assembly of claim 2 wherein said rotor has an end plate attached to an end of said rotor.

10. The rotor assembly of claim 2 further including a hollow shielded core within said rotor shell of said rotor wherein various elements of said rotor assembly may, be placed, shielded from said fluid flow.

11. The rotor assembly of claim 2 wherein along the axis, at each end of two ends of said rotor is an end rotor cross-section wherein both said end rotor cross sections are smaller in diameter than a said rotor cross-section midway between said end rotor cross-sections.

12. The rotor assembly of claim 11 wherein, starting at said end rotor cross-sections said plurality of rotor cross-sections are progressively advanced in rotation about the axis, in the direction of rotation of said rotor when driven by said fluid flow, until meeting at a common point along the axis.

13. The rotor assembly of claim 12 wherein each said interconnection joint falls on a two-dimensional plane.

14. The rotor assembly of claim 2 wherein said rotor has an additional plurality of modified rotor cross-sections in proximity of one or two ends of said rotor, wherein said modified cross-sections, having said concave sections and joined convex sections are not perpendicular to the axis.

* * * * *